(12) United States Patent
Zheng et al.

(10) Patent No.: US 8,720,409 B2
(45) Date of Patent: May 13, 2014

(54) OIL SQUIRTER WITH DAMPING VENT

(75) Inventors: Liyun Zheng, Troy, MI (US); Neil G. Klueber, Rochester Hills, MI (US); Karl R. Gilgenbach, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 243 days.

(21) Appl. No.: 13/415,303

(22) Filed: Mar. 8, 2012

(65) Prior Publication Data

US 2013/0233271 A1 Sep. 12, 2013

(51) Int. Cl.
*F01M 3/04* (2006.01)
*F01M 9/10* (2006.01)
*F01M 1/04* (2006.01)
*F16K 17/08* (2006.01)

(52) U.S. Cl.
CPC ............ *F16K 17/082* (2013.01); *F01M 1/04* (2013.01); *F01M 3/04* (2013.01)
USPC ............. 123/196 M; 123/196 R; 123/196 CP

(58) Field of Classification Search
CPC ............. F01M 1/04; F01M 1/16; F01M 3/04; F01M 9/10; F16K 17/082; F16K 3/34; F02F 3/22; F01P 3/08
USPC ...... 123/196 M, 19 CP, 90.33, 196 R, 73 AD, 123/190.13, 41.35; 137/565.13, 543.23
See application file for complete search history.

*Primary Examiner* — Noah Kamen
*Assistant Examiner* — Syed O Hasan
(74) *Attorney, Agent, or Firm* — Quinn Law Group, PLLC (57) ABSTRACT

An oil squirter for an engine includes a piston-type valve having a damping vent configured to damp oscillations of the valve piston during opening and closing. The valve piston may be spring biased and the valve may opened by oil pressure exerted on the piston at or above a cracking pressure. The damping vent controls displacement of the valve piston by creating delta pressure in oil contained in a piston chamber in opposition to axial piston movement during opening and closing of the valve, to stabilize the axial movement of the piston thereby damping valve oscillation during valve opening and closing. The damping vent operates to increase cracking stability and eliminate cyclic contact of the valve piston and valve seat to prevent noise, wear, binding, and oil system pressure fluctuations due to squirter valve instability.

20 Claims, 2 Drawing Sheets

OIL SQUIRTER WITH DAMPING VENT

TECHNICAL FIELD

The present invention relates to an oil squirter including a damping vent.

BACKGROUND

Oil squirters are used in engines to provide a directed flow of lubrication to a portion of the engine. In a typical configuration, an oil squirter may be provided in each engine cylinder, and may be configured to squirt oil through a nozzle to lubricate cylinder bore walls, especially during cold start, to prevent or reduce engine piston slap and noise therefrom. The oil squirter may direct a flow of lubrication to the engine piston, especially when the engine is operating at high speeds and/or hot temperatures, to cool the engine piston.

An oil squirter may include a nozzle in fluid communication with a valve body including a check valve, which may also be referred to as a one-way valve. The check valve includes a stopper, which may be configured as a ball or piston spring loaded or biased against a sealing interface or seat, to seal an orifice in communication with a pressurized oil source. When the oil pressure rises sufficiently to offset the spring bias, the stopper is displaced from the sealing interface such that oil flows through the orifice and valve body to exit out of the nozzle thereby providing lubrication to the engine cylinder and/or engine piston. The oil pressure at which the stopper is displaced from the sealing interface to allow oil flow past the sealing interface is referred to as the cracking pressure. At lower oil pressures, e.g., below the cracking pressure, the oil pressure is insufficient to overcome the spring bias and the orifice remains sealed by the stopper preventing oil flow through the squirter. The oil squirter may be configured with a cracking pressure which is above the oil pressure during normal driving conditions, e.g., driving conditions other than cold start, high heat, high speed, and the like, to prevent diversion of oil from other areas of the engine requiring lubrication and/or additional aeration of oil in the engine cylinder during normal driving conditions. Variability in the opening and closing of the stopper may cause fluctuations in oil flow rate through the valve above the cracking pressure.

Variability in the opening and closing of the stopper in the oil squirter may generate noise. For example, oscillation of the stopper during opening or closing may result in repetitive or cyclic contact between the stopper and the sealing interface, which may generate noise until the stopper is displaced sufficiently from the sealing interface to avoid contact of the stopper with the interface during oscillation, and to stabilize the flow of oil through the squirter valve. The cyclic contact may cause wear of one or both of the stopper and the sealing interface, which may create a leakage path through the sealing interface and/or reduce the cracking pressure of the squirter valve. A reduction in the cracking pressure may cause diversion of oil pressure through the squirter valve such that other areas of the engine may become under lubricated. Variability in the flow of oil through the squirter valve due to oscillation of the stopper may cause oscillations or fluctuations in the engine system oil pressure. Oscillation and/or excessive wear may cause binding or jamming of the stopper within the valve body, which may result in excessive oil flow through the squirter into the engine cylinder, blockage of the squirter valve resulting in oil starvation to the engine cylinder, and/or stopper breakage. Oil squirter noise, binding or breakage may result in customer complaints and/or customer dissatisfaction.

Variability in the opening and closing of the stopper may be reduced, for example, by constraining or damping the oscillating movement of the stopper using a damping surface in contact with the stopper, such as a secondary seat or interface proximate to the stopper. This approach may be disadvantaged by introducing another surface in contact with the stopper, adding additional cost as well as increasing the potential for wear and/or binding of the stopper due to contact with the secondary surface.

SUMMARY

An oil squirter including a damping vent is provided herein. The squirter may be configured for use in an engine, such as a combustion engine, and may be adaptable to direct lubrication from a pressurized oil source such as the engine oil gallery to a surface or area within the engine requiring lubrication or cooling, which may be a cylinder bore wall or engine piston within the engine. The oil squirter is generally configured as a piston type squirter including a nozzle assembly for directing flow of the oil and a piston-type valve assembly to control flow of the oil through the squirter. The piston is actuated by oil pressure from a pressurized oil source, referred to herein as source oil pressure. The pressurized oil source may be oil in an engine oil gallery in communication with the piston assembly which is pressurized to an engine system oil pressure.

The oil squirter includes a piston-type valve and a damping feature configured to damp oscillation of the piston during opening and closing. The valve piston may be spring biased such that the valve is opened by source oil pressure exerted on the piston at or above a cracking pressure. The piston and spring may be arranged in a piston bore to define a piston chamber in fluid communication with the piston, and such that oil may flow between the piston and piston bore and into the piston chamber, to fill the piston chamber with oil at a steady state pressure. The damping feature includes a vent defined by the valve body which is configured to control displacement of the valve piston such that oscillation of the valve piston during opening and closing is damped by creating delta pressure in the oil in the piston chamber in opposition to piston movement during opening and closing of the valve.

The damping vent may operate to reduce the rate of opening and closing of the valve to increase cracking stability, to increase the cracking pressure at which the valve opens, and to reduce or substantially eliminate oscillation of the piston during opening and closing to prevent noise originating from the opening and closing of the piston assembly and to prevent wear or binding of the valve due to repetitive or cyclic contact of the piston and valve seat during valve opening and closing. The damping feature may also be configured to vent air from the piston chamber into an atmosphere portion of the crankcase, to prevent hydrolock of the piston assembly. The damping vent is characterized by a damping dimension, which may define a cross-sectional area of the orifice forming the damping vent. The configuration of the damping vent may define the steady state pressure and delta pressure response of the oil in the piston chamber.

An oil squirter having a valve including a valve body and a piston assembly is provided. The valve body includes an inlet port configured to be in fluid communication with an oil source characterized by a source oil pressure, and a valve cylinder defining a valve seat and configured to receive the piston assembly. The piston assembly includes a piston guide configured to receive a biasing element and a piston having a first end and a second end. The piston is in slidable contact with the piston guide to define a clearance therebetween. The piston and piston guide define a piston chamber, wherein the piston chamber contains oil which flows into the piston chamber through the clearance. The biasing element is in operative contact with the piston chamber and the first end of the piston and is configured to bias axial movement of the piston toward the valve seat to close the valve when the oil pressure is below a predetermined pressure. The second end of the piston is in fluid communication with the inlet port and configured to selectively form a sealing interface with the valve seat. The oil source in fluid communication with the second end of the piston exerts a source oil pressure on the piston to actuate the piston to axially move away from the valve seat, to open the valve when the source oil pressure is at or above the predetermined pressure. The oil squirter may include one or more outlet ports defined by the valve body and in selective fluid communication with the inlet port. The outlet ports are configured to output oil from the squirter.

A damping vent in fluid communication with an atmosphere and the piston chamber is configured to create delta pressure in the oil in the piston chamber in opposition to oscillatory piston movement to stabilize the axial movement of the piston to prevent axial oscillation of the piston during valve opening and closing. The damping vent may be defined by the piston guide and configured to prevent hydrolock of the piston and the piston guide. The damping vent may stabilize the axial movement of the piston to prevent at least one of cyclic contact of the piston and the valve seat during valve opening and closing, and piston noise during valve opening and closing. The piston guide may be configured to axially align the piston with the valve seat to prevent at least one of binding of the piston, piston noise, and leakage due to axial misalignment of the piston and valve cylinder.

A method of controlling oil distribution in an engine using an oil squirter in fluid communication with engine oil characterized by an engine oil pressure is provided. The method includes providing an oil squirter including a valve defining a damping orifice or vent and characterized by a cracking pressure. The damping orifice of the valve piston assembly is in fluid communication with an atmosphere of the engine and a piston chamber defined by the piston guide and piston. The piston chamber is filled with oil characterized by a steady state pressure determined by the configuration of the damping orifice and a clearance between the piston and the piston guide. The method includes opening the valve by increasing the engine oil pressure to at least the cracking pressure to axially displace a piston away from a valve seat to flow oil to the oil outlet, and creating a delta pressure in the oil in the piston chamber relative to the steady state pressure in response to and opposing the piston displacement to unidirectionally displace the piston away from the valve seat while opening the valve.

The method may include closing the valve by decreasing the engine oil pressure below the cracking pressure to axially displace the piston toward the valve seat and seal the piston face to the valve seat to cease oil flow through the oil flow path, and creating a delta pressure in the oil in the piston chamber relative to the steady state pressure in response to and opposing the piston displacement to unidirectionally displace the piston toward the valve seat while closing the valve. Opening and closing the valve at a predetermined flow rate may include creating delta pressure in the oil contained in the piston chamber to prevent cyclic contact between the piston face and the valve seat during valve opening and closing, and to unidirectionally displace the piston without axial oscillation of the piston. The damping force provided by the delta pressure may be defined by a cross-sectional area of the damping orifice. The damping orifice may be defined by the piston guide and configured to prevent hydrolock of the piston and the piston guide.

The above features and other features and advantages of the present invention are readily apparent from the following detailed description of the best modes for carrying out the invention when taken in connection with the accompanying drawings.

DETAILED DESCRIPTION

Figure 1:
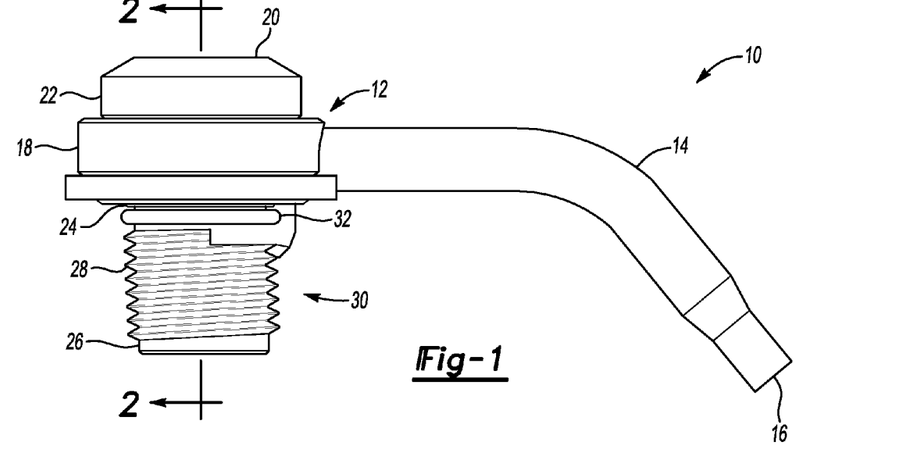
FIG. 1 is a schematic perspective view of an oil squirter including a valve having a damping feature.

Referring to the drawings wherein like reference numbers represent like components throughout the several figures, the elements shown in FIGS. 1-4 are not necessarily to scale or proportion. Accordingly, the particular dimensions and applications provided in the drawings presented herein are not to be considered limiting. FIG. 1 shows a squirter assembly generally indicated at 10, which may be referred to herein as a squirter. The squirter 10 may be configured for use in a combustion engine (not shown) and adaptable to direct lubrication such as pressurized oil 40, which may be oil from a pressurized oil source such as an engine oil gallery, to a surface or area within the engine requiring lubrication or cooling, which may be a cylinder bore wall (not shown) or engine piston (not shown) within the engine. The squirter 10 may be positioned in the crankcase (not shown) of the engine, such as a wall portion of the crankcase, and such that a valve body 22 of the squirter 10 has a first body portion 24 in fluid communication with an atmosphere portion of the crankcase and a second body portion 26 in fluid communication with a source (not shown) of the pressurized oil 40, which may be an oil gallery configured to provide pressurized oil to the engine and engine system including the squirter. The squirter 10 may be retained in the crankcase via an interface portion 28, which in the example shown is a threaded portion. A sealing element, such as an o-ring 32, may be provided to seal the interface between the atmosphere side of the crankcase and the oil side of the crankcase, when the squirter 10 is in an installed position in the crankcase.

The squirter 10 is generally configured as a piston-type squirter including a nozzle portion 12 for directing flow of the oil, and a piston-type valve assembly 30 housed in the valve body 22 and configured to control flow of the oil through the squirter 10. The piston-type valve assembly 30 may be referred to herein as a piston assembly. The squirter 10 may include a nozzle portion 12 in fluid communication with the valve 20, and configured to direct the flow of lubrication within the engine. The nozzle portion 12 may include a nozzle 14 defining an outlet or opening 16. A collar portion 18 may be configured to provide an oil path between the valve 20 and the nozzle 14 by being in fluid communication with an oil outlet port 42 defined by the valve body 22 and shown in FIG. 2. The squirter 10 may be configured with more than one nozzle 14, which may be in fluid communication with the oil outlet port 42 through the collar portion 18. The valve body 22 may include more than one oil outlet port 42, as shown in FIG. 2, in fluid communication with the collar portion 18 and selectively with the oil 40.

Figure 2:
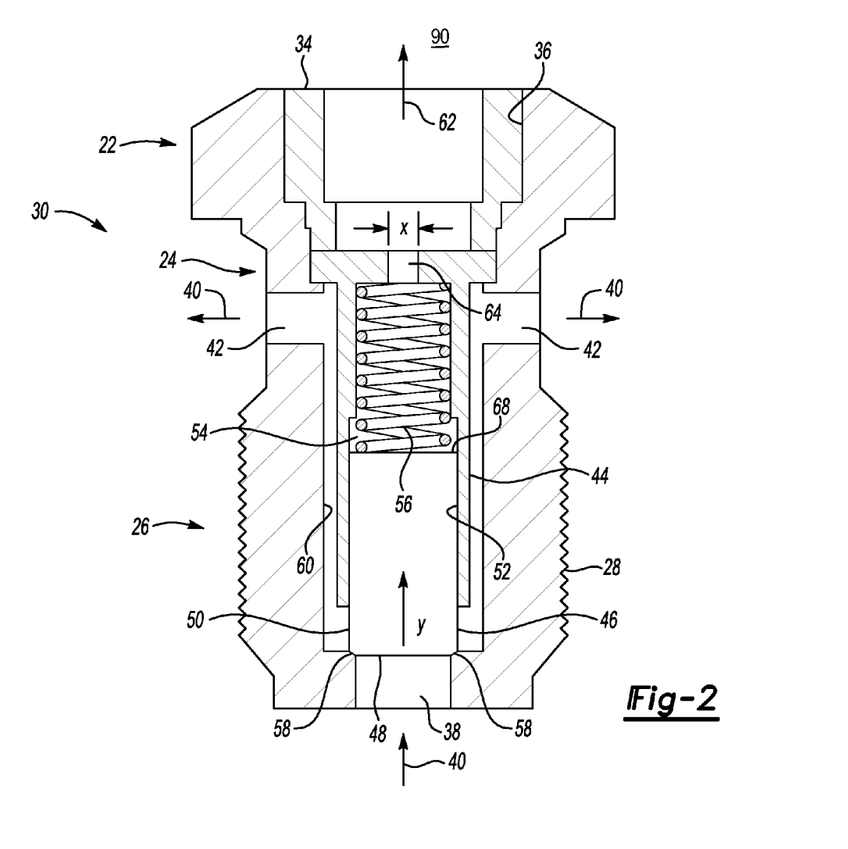
FIG. 2 is a schematic cross-sectional view of section 2-2 of the oil squirter valve of FIG. 1.

FIG. 2 shows a cross-sectional illustration of the valve 20 of the squirter 10 in a closed position, with a piston 46 in sealing contact with a valve seat 58. The valve 20 is actuated by the pressurized oil 40, which may be oil from an oil source such as an engine oil gallery in communication with the valve 20 and piston assembly 30, which may be pressurized at an engine system oil pressure. At a predetermined pressure, which may be a cracking pressure $P_c$ of the valve 20, the pressurized oil 40 entering through an inlet port 38 exerts sufficient pressure on the piston 46 to displace the piston 46 away from the valve seat 58 in a direction y, thereby opening the valve 20 and flowing oil 40 through an oil path defined by the piston 46, a valve cylinder 60, a piston guide 44 and the outlet port(s) 40. In one example, the cracking pressure $P_c$ may be greater than the engine system oil pressure under normal engine operating conditions, to prevent opening of the valve 20 and diversion of oil to the squirter during normal engine operating conditions.

The squirter 10 includes a damping feature 64. The damping feature 64 is configured to substantially eliminate noise and valve wear in the valve 20 by stabilizing the axial movement, e.g., the displacement y, of the valve piston 46, thereby substantially eliminating oscillatory movement of the piston 46 and/or cyclic contact of the valve piston 46 with the valve seat 58. The damping feature 64 is defined by a damping dimension x and is configured to effectively dampen the valve 20 to prevent the oscillatory movement of the piston 46 during valve opening and closing by creating a delta pressure in oil 40 in a piston chamber 54 during valve opening and closing, such that the delta pressure provides a damping force in opposition to the oscillatory movement. The magnitude of the delta pressure and damping force is defined by the damping dimension x, such that the smaller the damping dimension x, the larger the delta pressure and delta force created in opposition to the valve oscillation. The delta pressure, as that term is used herein, is a pressure differential relative to an average or steady state pressure characterizing the oil 40 in the piston chamber 54 during engine operation. The delta pressure may be an instantaneous pressure differential providing an instantaneous damping force in opposition to oscillatory movement of the piston 46. By stabilizing the movement of the piston 46 to prevent piston oscillation, the damping vent 64 prevents the noise, valve wear and binding which may be produced by cyclic contact of the piston 46 and valve seat 58 during oscillatory movement of the piston 46, as described in further detail herein. The damping feature 64 may also be configured to vent air 62 from the piston cylinder cavity 54 into the atmosphere portion of the crankcase generally indicated at 90, to prevent hydrolock of the piston assembly 30 and valve 20. The damping feature 64 may be referred to herein as a damping vent, a vent, an orifice, and a damping orifice.

As shown in FIG. 2, the valve 20 includes a valve body 22 and a piston assembly generally indicated at 30. The valve body 22 defines the oil inlet port 38, which is configured to be in fluid communication with the pressurized oil 40, wherein the pressurized oil 40 is provided by an oil source (not shown) and characterized by a source oil pressure. The oil source may be an engine oil gallery or engine oil system, such that the source oil pressure is determined by the engine oil system pressure. The valve body 22 defines a generally axial valve cylinder 60 configured to receive the piston assembly 30. The valve body 22 may include an opening 36 through which the piston assembly 30 may be inserted into the valve cylinder 60. The opening 36 may be in fluid communication with the atmosphere 90, and may be configured to receive a plug or cap 34. The plug 34 may be configured to interface with the opening 36 to retain the piston assembly 30 in the valve cylinder 60. The valve body 22 includes a valve seat 58, which may be defined by the valve cylinder 60, configured to sealably contact the piston 46 to close the valve 20 thereby ceasing the flow of oil 40 through the valve 20 to the outlet port(s) 42. The piston assembly 30 includes a piston guide 44, a biasing element 56, and the valve piston 46. The piston guide 44 is configured to receive the biasing element 56 and the piston 46 such that a piston chamber 54 is defined by the piston 46 and piston guide 44. The piston 46 and biasing element 56 are generally axially oriented within the piston guide 44. A clearance 52 is defined by the piston 46 in slidable contact with the piston guide 44. The clearance 52 is sized such that oil 40 may flow through the clearance 52 between the valve cylinder 60 and the piston chamber 54 to fill the piston chamber 54 with oil 40. The damping vent 64 is in fluid communication with the piston chamber 54. In the absence of a force input, such as axial movement of the piston 44, the oil 40 in the piston chamber 54 is characterized by a steady state pressure determined by the configuration of the damping vent 64 and the clearance 52. The steady state pressure of the oil 40 in the chamber 54 may be a slightly positive pressure when the engine is operating in a condition where damping may be needed, for example, when the engine is operating at relatively high speed and high temperature.

The piston 46 includes a first end 68 in operative contact with the biasing element 56 and in fluid communication with the oil 40 in the piston chamber 54. A second end 48 of the piston 46 is configured to selectively form a sealing interface with the valve seat 58 and is in fluid communication with the inlet port 38 and the oil 40. The second end 48 of the piston 46 may be referred to herein as a piston face or sealing face.

The biasing element 56 may, by way of example, be configured and/or referred to herein as a spring. The spring 56 is in operative contact with the axial cavity 54 and piston 46 and configured to bias the axial movement of the piston 46 toward the valve seat 58 to close the valve 20 when the oil 40 is below a predetermined pressure, e.g., the spring 56 exerts sufficient spring force on the piston 46 to offset the actuating force of the oil 40 when the oil is below a predetermined pressure such that a second end 48 of the piston 46 is maintained in sealing contact with the valve seat 58.

In a valve opening sequence, when the oil 40 at the inlet 38 and in fluid communication with the second end 48 of the piston 46 exerts oil pressure at or above a predetermined pressure on the piston 46, the spring force exerted by the spring 56 is overcome and the piston 46 is actuated to move axially away from the valve seat 58, e.g., the piston 46 is displaced in a direction y, to open the valve. The piston 46 may begin to move away from the valve seat 58 at a cracking pressure $P_c$, wherein the cracking pressure is defined by the configuration of the valve 20. As referred to herein, the piston displacement y refers to the amount the piston 46 is displaced from, e.g., separated from, the valve seat 58, which may be indicated, for example, as a distance y representing the axial displacement of the second end 48 from the valve seat 58. Below the cracking pressure, the second end 48 is in sealing contact with the valve seat 58 such that the displacement distance y is zero, and oil flow through the valve 20 is prevented by the sealing contact maintained between the second end 48 and the valve seat 58 under the force of the spring 56. At the predetermined pressure, the spring force is overcome and the piston 46 is displaced axially away from valve seat 58, where the displacement distance y is proportional to the system oil pressure, e.g., as the system pressure of oil 40 increases, the displacement distance y increases and the flow rate of oil 40 through the valve 20 increases. In a valve closing sequence, the system pressure of the oil 40 at the inlet 38 and in fluid communication with the piston 46 falls from above the predetermined pressure to below the predetermined pressure, such that the spring force exerted by the spring 56 overcomes the force of the oil pressure 40 when it falls below the predetermined pressure, actuating the piston 46 to move axially toward the valve seat 58, and decreasing the displacement distance y until the valve 20 closes when the piston 46 makes sealing contact with the valve seat 58, at which point the displacement distance y is decreased to zero.

The damping vent 64 is configured to stabilize axial movement of the piston 46 during the valve opening and closing sequences, by creating a delta pressure in the oil 40 in the piston chamber 54 in opposition to oscillatory movement of the piston 46, such that the oscillatory movement of the piston 46 is restricted, stabilized, and/or eliminated during valve opening and closing by the damping force of the delta pressure exerted on the piston 46. By stabilizing and restricting the axial movement of the piston 46 using the damping force of the delta pressure, the axial movement of the piston 46 is made unidirectional, e.g., the oscillatory piston movement is damped such that axial oscillation, e.g., cyclical movement of the piston 46 with respect to its axis, is prevented, and the damped movement of the piston 46 is restricted to movement in a single direction away from the valve seat 58 during valve opening, and is restricted to movement in a single direction toward the valve seat 58 during valve closing. By damping the valve 20 using the delta pressure created in the oil in the piston chamber 54, cyclic movement of the piston, which may cause cyclic contact with the valve seat 58, is prevented. By preventing cyclic movement of the piston 46, wear of either of the second end 48 and valve seat 58 which may result from the cyclic contact of the piston 46 and the valve seat 58 is avoided. Additionally, by preventing cyclic movement of the piston 46 and thereby preventing cyclic contact between the piston 46 and the valve seat 58, piston noise attributable to the valve 20 is eliminated. Further, by stabilizing and restricting the axial movement of the piston 46 during opening and closing sequences, the change in the flow rate of the oil 40 through the valve 20 may be stabilized, such that the flow rate increases or decreases at a steady rate and without fluctuations which may cause variability in engine system oil pressure, where such variability may be detrimental to oil supply to other areas of the engine system.

The damping vent 64 is shown in FIG. 2 in fluid communication with an atmosphere 90, which may be the crankcase atmosphere, and in fluid communication with the axial cavity 54 housing the spring 56. The damping vent 64 is characterized by a damping dimension x, which corresponds to or defines a predetermined cross-sectional area which establishes, in combination with the clearance 52, a steady state pressure of the oil 40 in the piston chamber 54, and creates, in opposition to oscillatory input from the piston 46, delta pressure and delta damping force to dampen movement of the piston 46. The delta pressure created in the oil 40 in the cavity 54 stabilizes the axial movement of the piston 46, as measured by the vertical displacement y, such that axial oscillation of the piston 46 is damped during opening and closing of the valve 20. In one example, the damping vent 64 is configured as a cylindrical orifice defined by the piston guide 44, where the cylindrical orifice defines a damping diameter x. The damping vent 64 may be configured to prevent hydrolock of the piston 46 and the piston guide 44, such that the damping vent 64 is dual purposed to dampen piston movement and prevent hydrolock. The damping dimension x may be configured to provide the minimum cross-sectional area of the vent 64 required to prevent hydrolock of the piston 46. The damping vent 46 may stabilize the axial movement of the piston 46 to prevent cyclic contact of the piston 46 and the valve seat 58 during valve opening and closing, and/or to prevent piston noise during opening and closing of the valve 20.

The piston guide 44 may be configured to axially align the piston 46 and/or second end 48 with the valve seat 58 to prevent binding of the piston 46, to prevent piston noise, and/or to prevent leakage through the sealing interface formed by the second end 48 and valve seat 58 due to axial misalignment of the piston 46 and the valve cylinder 60.

Oscillatory movement of the piston 46, as used herein, refers to cyclic or non-unidirectional movement of the piston 46 during an opening or closing cycle, such that displacement of the piston 46 from the valve seat 58 is cyclic and bi-directional along an axis of the piston 46. Valve oscillation from undamped oscillatory movement of the piston 46 may occur in a valve not including the damping feature 64. Oscillatory movement of the piston 46 may occur in a vented valve where the vent is not configured as a damping vent 64, as may be the case when the non-damping vent is defined by a cross-section characterized by a dimension other than the damping dimension x. Non-oscillatory or stable movement of the piston 46, as used herein, refers to uni-directional piston movement such that the displacement of the piston 46 from the valve seat 58 consistently changes in one direction, e.g., is characterized by an absence of axial oscillation or cyclic axial movement, which results from damping movement of the piston 46 using the damping vent 64. For example, and referring to FIGS. 2 and 4, during an opening cycle of the valve 20, the piston 46 is displaced in a direction indicated by the arrow y, such that the second end 48 is displaced from the valve seat 58 to allow oil 40 to flow through the valve 20 to the outlet port 42. When the valve 20 is closed, e.g., when the second end 48 is in sealed contact with the valve seat 58, the amount of displacement y is zero. Unidirectional or non-oscillating movement of the piston 46 away from the valve seat 58 during valve opening would be indicated by a constantly increasing and positive value of y, that is, the piston moves in one direction away from the valve seat 58, such that the gap defining the flow path between the valve seat 58 and the piston face 48 steadily increases, and the flow rate of the oil 40 through the valve 20 steadily and smoothly increases, e.g., the change in flow rate is substantially linear, as shown by line 72B on FIG. 3. Unidirectional or non-oscillating movement of the piston 46 away from the valve seat 58 during valve closing would be indicated by a constantly decreasing value of y, that is, the piston moves in one direction toward the valve seat 58, such that the gap defining the flow path between the valve seat 58 and the second end 48 steadily decreases, and the flow rate of the oil 40 through the valve 20 steadily and smoothly decreases, e.g., the change in flow rate is substantially linear, as shown by line 72A on FIG. 3.

Figure 3:
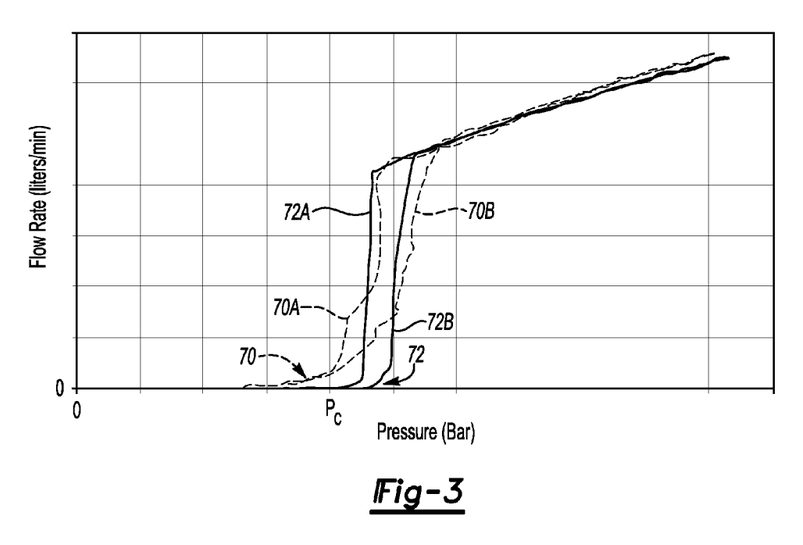
FIG. 3 is a schematic illustration of the relationship of squirter oil flow rate to actuating system oil pressure during an opening and closing cycle of the valve of FIG. 2 and a contrasting valve not including the damping feature of the valve of FIG. 2.
Figure 4:
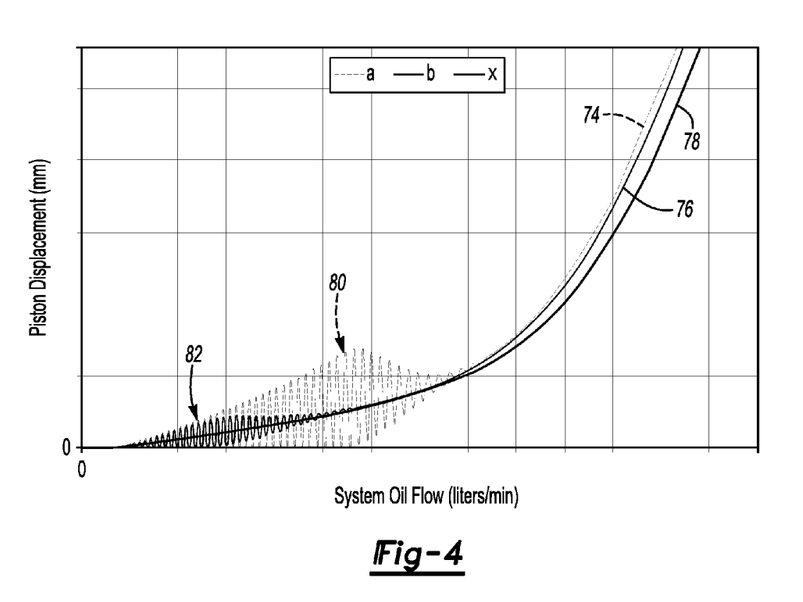
FIG. 4 is a schematic illustration of the relationship of piston displacement to system oil flow rate for the valve of FIG. 2 and for contrasting valves not including the damping feature of the valve of FIG. 2.

Referring now to FIGS. 3 and 4, FIG. 3 shows a schematic representative illustration of the relationship of oil flow rate through the valve 20 (vertical axis of FIG. 3) to the system oil pressure of the oil 40 at the inlet port 38 (horizontal axis of FIG. 3) during an opening and closing sequence of the valve 20 described herein and a contrasting valve. FIG. 4 shows a schematic representative illustration of the relationship of piston displacement y (vertical axis of FIG. 4) to system oil flow rate (horizontal axis of FIG. 4) for the valve 20 described herein and for two contrasting valves, during valve opening and closing. By way of example, the damped valve 20 and contrasting valve(s) (not shown) represented in FIGS. 3 and 4 may be valves of the type included in an oil squirter configured to provide selective lubrication to an engine piston and/or engine cylinder, where the source of pressurized oil actuating each respective valve is the engine system oil, which is provided to each respective valve's oil inlet at an engine system pressure, which may be referred to herein as an actuating pressure.

Referring now to FIG. 3, the solid lines generally indicated at 72 and including curve segments 72A and 72B correspond to a representative valve curve for the damped valve 20 including the damping feature 64 as described herein. The curve segments 72A and 72B represent the hysteresis portion of the valve curve 72, wherein the curve segment 72B corresponds to the flow rate of oil 40 through the damped valve 20 near the beginning of the valve opening sequence, and the curve segment 72A corresponds to the flow rate of oil 40 through the damped valve 20 near the end of the valve closing sequence. The dashed lines generally indicated at 70 and including curve segments 70A and 70B correspond to a representative valve curve for a contrasting valve (not shown), where a contrasting valve, as that term is used herein, may be, for example, a valve which does not include a vent, which does not include the damping vent 64, and/or a valve which does not include a vent having a cross-sectional area defined by the damping dimension x, such that the contrasting valve does not generate a delta pressure in opposition to oscillatory movement of the piston 46. The curve segments 70A and 70B represent the hysteresis portion of the valve curve 70, wherein the curve segment 70B corresponds to the flow rate of oil through the contrasting valve near the beginning of the valve opening sequence, and the curve segment 70A corresponds to the flow rate of oil through the contrasting valve near the end of the valve closing sequence. Referring generally to the valve curves 70, 72, it would be understood that during the opening sequence the actuating oil pressure, which in the present example is the engine system oil pressure, increases sufficiently to cause the piston 46 to move axially away from the valve seat 58, thus opening the valve to allow oil to flow through the valve at a flow rate indicated in FIG. 3. The flow rate of the oil 40 through the valve generally increases as the flow path widens, e.g., as the displacement distance y increases during axial movement of the piston 46, and/or as the actuating oil pressure increases. During the closing sequence the actuating oil pressure decreases sufficiently to cause the piston 46 to move axially toward the valve seat 58, reducing the flow rate of oil through the valve as the displacement distance y decreases, and, when the actuating pressure has dropped sufficiently, closing the valve to cease oil flow through the valve as indicated in FIG. 3.

As shown in FIG. 3, the valve curve 72 for the damped valve 20 is characterized by zero flow at actuating pressures below the cracking pressure Pc, indicating no leakage through the sealing interface between the second end 48 and valve seat 58 prior to valve opening, resultant from the pressure of the oil 40 in the piston chamber 54 in combination with the spring 56 biasing the piston 46 against the valve seat 58. During the opening sequence of the damped valve 20 represented by the curve segment 72B, the axial displacement of the piston 46 away from the valve seat 58 is controlled by compression of the spring 56, the average or steady state pressure of the oil 40 in the piston chamber 54, and delta pressure created in the oil 40 in the piston chamber 54 in opposition to oscillatory movement of the piston 46 wherein the steady state pressure and delta pressure is influenced by the cross-sectional area of the damping vent 64 defined by the damping dimension x, such that the piston 46 moves unidirectionally away from the valve seat 58 without oscillating, e.g., the displacement distance y consistently increases as the oil flow increases, as shown by line 78 in FIG. 4, which is representative of the valve 20 including the damping vent 64 having a damping dimension x. The increase in flow rate at the beginning of the opening sequence, as represented by the curve segment 72B, is substantially linear, such that the change in flow rate through the valve 20 is stable, e.g., consistently increasing at a substantially constant rate during the valve opening sequence, where the stability is resultant from damping the axial movement of the piston 46 using the damping force of the delta pressure created in the oil 40 in the piston chamber 54. By stabilizing the change in flow rate through the valve 20, the engine system oil pressure is not subject to fluctuations attributable to unstable and/or variable oil flow rates through the valve 20 during the opening sequence.

During the closing sequence of the damped valve 20 represented by the curve segment 72A, the axial displacement of the piston 46 toward the valve seat 58 is controlled by the biasing force of the spring 56, the average or steady state pressure of the oil 40 in the piston chamber 54, and delta pressure created in the oil 40 in the piston chamber 54 in opposition to oscillatory movement of the piston 46 wherein the steady state pressure and delta pressure is influenced by the damping dimension x, such that the piston 46 moves unidirectionally toward the valve seat 58 without oscillating, e.g., the displacement distance y consistently decreases as the system oil pressure decreases, as shown by line 78 in FIG. 4, which is representative of the valve 20 including the damping vent 64 having a damping dimension x. The decrease in flow rate near the end of the closing sequence, as represented by the curve segment 72A, is substantially linear, such that the change in flow rate through the valve is stable, e.g., consistently decreasing at a substantially constant rate during the valve closing sequence, where the stability is resultant from damping the axial movement of the piston 46 using the damping vent 64. By stabilizing the change in flow rate through the valve 20, at least in part by creating a delta pressure in the oil 40 in the chamber 54 to stabilize the movement of the piston 46, the engine system oil pressure is not subject to fluctuations attributable to unstable and/or variable oil flow rates through the valve 20 during the closing sequence, which may increase oil availability and minimize oil starvation and aeration in other portions of the engine supplied by the engine system oil.

Further, by stabilizing the piston 46 such that axial movement of the piston 46 is unidirectional during opening and closing sequences, cyclic movement is prevented, as shown by the piston displacement line 78 in FIG. 4, and contact between the piston 46 and the valve seat 58, due to oscillation of the piston, is prevented. By preventing cyclic contact at the sealing interface, noise and/or wear attributable to piston 46 and valve seat 58 contact in the valve 20, which may be referred to as valve flutter, is prevented.

By way of contrast and comparison, as shown in FIG. 3, the valve curve 70 for a contrasting valve (not shown) illustrates a combination of characteristics which may be exhibited, singularly or collectively, by the contrasting valve, e.g., a valve not having the damping vent 64 defined by the damping dimension x. For example, a contrasting valve, as represented by the valve curve 70, may be characterized by oil flow beginning at an actuating pressure lower than the cracking pressure $P_c$ of the damped valve 20, which may be due to sealing instability or leakage through the sealing interface of the contrasting valve resultant from variability in the movement of the piston and spring, including a non-damped or direct spring response to variability in the actuating pressure. During the opening sequence of the contrasting valve represented by the curve segment 70B, the axial displacement of the non-damped piston away from the valve seat 58 may be directly controlled by compression of the spring 56 and the actuating pressure of the oil 40, each of which may exhibit variability causing the non-damped piston to be unstable or oscillate as it moves away from the valve seat, e.g., the displacement distance y may increase and decrease as the oil flow increases, as shown in FIG. 4 by the cyclic pattern of segment 80 of line 74 corresponding to a first example of a contrasting valve, and/or the cyclic pattern of segment 82 of line 76 corresponding to a second example of a contrasting valve. The change in flow rate as the valve opens, as indicated by the non-linear and unstable characteristics of curve segment 70B, and the initial low flow rate at valve cracking, may cause fluctuations in the engine system pressure and in the flow of oil through a squirter including the contrasting valve, which may be detrimental to engine operating conditions by varying oil supply to the engine cylinder and engine piston lubricated by the squirter and to other portions of the engine.

During the closing sequence of a contrasting valve represented by the curve segment 70B, the axial displacement of the non-damped piston toward the valve seat may be controlled by the biasing force of the spring and other factors within the non-damped piston assembly, such as variability in the interface between the piston and piston cylinder, which may result in instability and oscillation of the non-damped piston during the closing sequence. Variability in the decreasing actuating pressure of the oil 40 may directly affect the movement of the non-damped piston, causing cyclic or oscillatory axial movement or other instability in the rate, magnitude and direction of displacement as the non-damped piston moves toward the valve seat. As shown in FIG. 4 by line segment 80 of line 74 in the first example of a contrasting valve, and by line segment 82 of line 76 in the second example of a contrasting valve, the displacement distance y is cyclic, e.g., it increases and decreases as the system oil pressure decreases, due to oscillation and instability in the contrasting valves represented by lines 74, 76. The decrease in flow rate near the end of the closing sequence of the contrasting valve, as represented in FIG. 3 by the curve segment 70A, is non-linear and inconsistent in its rate of change, such that the change in flow rate through the contrasting valve is unstable, e.g., inconsistently decreasing at a variable rate during the valve closing sequence, due to an absence of damping. The inconsistency in flow rate during the closing sequence of the contrasting valve may cause the engine system oil pressure to fluctuate resulting in unstable and/or variable oil supply to other portions of the engine system and/or oil aeration.

Further, the cyclic movement of the contrasting valve, as shown in FIG. 4 by line segment 80 of line 74 in the first example of a contrasting valve, and by line segment 82 of line 76 in the second example of a contrasting valve, may result in contact between the non-damped piston and the valve seat, due to piston oscillation and/or instability, causing noise and/or wear. Wearing of the piston and/or the valve seat may create leak paths through the sealing interface of the contrasting valve, resulting in oil flow through the contrasting valve at engine system oil pressures below the predetermined pressure, which may cause oil starvation in other areas of the engine and/or other unintended fluctuations in oil system pressure.

Accordingly, the advantages of the damped valve 20 and damping vent 64 are illustrated by comparing and contrasting, in FIG. 3, the damped valve 20 curve 72 and contrasting valve curve 70, and by comparing and contrasting, in FIG. 4, the damped valve 20 displacement line 78 to either of the displacement lines 74, 76 of the contrasting valves. As illustrated by FIGS. 3 and 4, the damping vent 64 may be configured to reduce the rate of opening and closing of the valve 20, improve the linearity and stability of the rate of change of flow rate as compared with a contrasting valve, eliminate and/or prevent piston instability and oscillation during the opening and closing sequences, increase cracking stability, eliminate and/or prevent fluctuations in system oil pressure by eliminating piston oscillation and non-linear changes in flow rate of oil through the valve, and eliminate and/or prevent noise by preventing cyclic contact between the piston and valve seat at the sealing interface.

Referring to FIG. 4, the relationship between the vent configuration and the piston displacement behavior is illustrated. Line 78 is representative of the piston displacement y during an opening or closing sequence of the damped valve 20 including the damping vent 64 as described herein, e.g., where the damping vent 64 is characterized by a damping dimension x defining the cross-sectional area of the damping vent 64 and configured to create delta pressure in the oil 40 in the chamber 54 in opposition to piston movement during valve opening and closing. As shown in FIG. 4 for the damped valve 20 corresponding to the line 78, the piston displacement y increases consistently and unidirectionally, e.g., smoothly and without cyclic variation, as the system oil flow, e.g., the actuating pressure, increases. Similarly, the piston displacement y of the valve 20 decreases unidirectionally, e.g., without cyclic variation, as the system oil flow, e.g., the actuating pressure, decreases. The smooth unidirectional displacement of the piston 46 illustrated by line 78 is attributable to the damping force provided by the delta pressure created in the oil 40 in the chamber 54.

In the first contrasting example shown in FIG. 4, line 74 including line segment 80 corresponds to a first contrasting valve including a vent characterized by a vent dimension a defining the cross-sectional area of the non-damping vent, hereinafter "the non-damping a vent", where a>>b>x. The non-damping a vent may be provided to prevent hydrolock of the piston, and may be configured with a>>x such that the average pressure of the oil 40 may fluctuate without creating a delta pressure response to movement of the piston 46, e.g., the oil 40 in the chamber 54 does not constrain or stabilize movement of the piston, and the non-damped piston responds directly to variability from the biasing spring and the system oil flow, and may, as shown by the line segment 80, demonstrate inconsistent and cyclic piston displacement during the opening and closing sequence of the first contrasting valve corresponding to line 74, which may, as described previously, result in one or more of noise due to cyclic contact at the sealing interface of the piston and valve seat, oil pressure fluctuation and instability, piston oscillation, and non-linearity in flow rate change during opening and closing of the first contrasting valve.

In the second contrasting example shown in FIG. 4, line 76 including line segment 82 corresponds to a second contrasting valve including a vent characterized by a vent dimension b defining the cross-sectional area of the non-damping vent, hereinafter "the non-damping b vent", where a>>b>x. The non-damping b vent may be provided to prevent hydrolock of the piston, and may be configured with b>x such that delta pressure may be created in the oil 40 in the chamber 54 in response to piston movement, however the damping force resultant from the delta pressure created may not be sufficient to fully offset piston oscillation, variability of the biasing spring and/or variability in the actuating oil pressure. As such, the non-damping b vent may create a damping force which may reduce the magnitude of the piston oscillation during opening and closing of the second contrasting valve, but does not fully constrain or stabilize movement of the piston, and may, as shown by the line segment 82, allow inconsistent and cyclic piston displacement during the opening and closing sequence of the second contrasting valve corresponding to line 76, which may, as described previously, result in one or more of noise due to cyclic contact at the sealing interface of the piston and valve seat, oil pressure fluctuation and instability, piston oscillation, and non-linearity in flow rate change during opening and closing.

A method of controlling oil distribution in an engine using the oil squirter 10 in fluid communication with engine oil 40 characterized by an engine oil pressure is provided. The method includes providing the oil squirter 10 including the valve 20 defining an oil flow path in fluid communication with the engine oil 40 and an oil outlet 42, the valve 20 characterized by a predetermined cracking pressure $P_c$ and including a valve body 22 and a piston assembly 30, configured as previously described. The valve 20 includes the damping vent, also referred to herein as a damping orifice 64 of the piston assembly in fluid communication with the engine atmosphere 90 and the piston chamber 54 and configured to create delta pressure in the oil 40 in the piston chamber 54 in opposition to oscillation of the piston 46 during valve opening and closing as previously discussed.

The method further includes opening the valve 20 by increasing the engine oil pressure 40 to at least the cracking pressure to axially displace the piston away from the valve seat to flow oil through the oil flow path to the oil outlet 42, and creating a delta pressure in the oil 40 in the chamber 54 in opposition to oscillation of the piston 46 to unidirectionally displace the piston 46 away from the valve seat 58 while opening the valve 20.

The method may include closing the valve 20 by decreasing the engine oil pressure below the cracking pressure $P_c$ to axially displace the piston 46 toward the valve seat 58 and seal the second end 48 to the valve seat 58 to cease the flow of oil 40 through the oil flow path defined by the valve cylinder 60, the piston guide 44 and the piston 46, and creating a delta pressure in the oil 40 in the chamber 54 in opposition to oscillation of the piston 46 to displace the piston unidirectionally toward the valve seat 58 while closing the valve 20. Opening and closing the valve 20 at a predetermined flow rate may include maintaining a steady state pressure, which may be a slightly positive pressure, of the oil 40 in the chamber 54 on the piston 46, and/or creating delta pressure in the oil 40 in the chamber 54 in opposition to movement of the piston 46 to prevent cyclic contact between the second end 48 and the valve seat 58 during valve opening and closing, and to unidirectionally displace the piston 46 without axial oscillation of the piston 46. The magnitude of the delta pressure and damping force created therefrom may correspond to a cross-sectional area of the damping orifice 64 characterized by the damping dimension x. The damping orifice 64 may be defined by the piston guide 44 and configured to prevent hydrolock of the piston 46 and the piston guide 44.

The oil squirter 10 including a valve 20 configured with a damping vent 64 as described herein may be included in an engine (not shown). The engine may include a crankcase defining an atmosphere 90, and an oil gallery containing oil 40 at an engine oil pressure. The oil squirter 10 may be operatively attached to the crankcase, for example, by threading or otherwise operatively installing or affixing the squirter 10 into an opening in the crankcase (not shown) configured to receive the squirter 10 and interface with the interface portion 28 (see FIGS. 1 and 2) of the valve body 22, such that the piston 46 is in fluid communication with the oil gallery through the inlet port 38 and the damping vent 64 is in fluid communication with the atmosphere 90 of the crankcase. The oil squirter 10 may include a sealing element, such as an o-ring 32, configured to provide a seal between the squirter 10 or the valve body 22 and the crankcase opening, to prevent leakage of air from the atmosphere 90 or oil from the pressurized oil source 40 through the interface portion 28. The oil squirter 10 includes a nozzle assembly 12, which may include a nozzle 14 defining an outlet 16 configured to distribute oil provided by the valve 20 from the oil gallery within the crankcase. The valve 20 may be configured as previously described herein, including the damping vent 64 in fluid communication with the atmosphere 90 and the piston chamber 54 wherein the oil 40 in the piston chamber 54 is characterized by a steady state pressure determined by the damping orifice 64 in combination with a clearance 52 between the piston 46 and the piston cylinder 44.

During engine operation, the engine system oil pressure may vary above and below a predetermined pressure at which the valve 20 is opened and closed, respectively, by displacement of the piston 46 with respect to the valve seat 58, as described previously. During opening and closing of the valve 20, the damping vent 64 stabilizes the axial movement of the piston 46 by providing a steady state and/or delta pressure in the oil 40 in the piston chamber 54 such that when the engine oil pressure is below a valve cracking pressure $P_c$, the second end 48 and the valve seat 58 are in sealing contact to close the valve 20 thereby preventing oil flow through the valve 20 and squirter 10, and when the engine oil pressure is above the valve cracking pressure $P_c$, the second end 48 is axially displaced from the valve seat 58 to open the valve 20 and allow oil flow through the valve 20, axial oscillation of the piston 46 and cyclic contact of the piston 46 and valve seat 58 are prevented. The damping vent 64 may stabilize the axial movement, e.g., the displacement y, of the piston 46 during valve opening and closing such that fluctuations in engine oil pressure attributable to valve opening and closing are minimized. In one example, the engine oil pressure during normal engine operation is less than the valve cracking pressure $P_c$.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An oil squirter comprising:
a valve including a valve body and a piston assembly, wherein:
the valve body includes:
an inlet port configured to be in fluid communication with an oil source characterized by a source oil pressure;
a valve cylinder defining a valve seat and configured to receive the piston assembly; and
the piston assembly includes:
a piston guide defining an axial chamber configured to receive a biasing element, wherein the chamber contains oil;
a piston having a first end and a second end, the piston in slidable contact with the piston guide;

the biasing element in operative contact with the chamber and the first end of the piston and configured to bias axial movement of the piston toward the valve seat to close the valve when the source oil pressure is below a predetermined pressure;

the second end of the piston in fluid communication with the inlet port and configured to selectively form a sealing interface with the valve seat;

the oil source in fluid communication with the second end of the piston and exerting the source oil pressure on the piston to actuate the piston to axially move away from the valve seat to open the valve when the source oil pressure is at or above the predetermined pressure; and a damping vent in fluid communication with an atmosphere and the chamber and configured to create delta pressure in the oil in the chamber to stabilize the axial movement of the piston to prevent axial oscillation of the piston during valve opening and closing.

2. The oil squirter of claim 1, wherein the damping vent stabilizes axial movement of the piston to unidirectionally displace the piston without axial oscillation of the piston during valve opening and closing.

3. The oil squirter of claim 1, wherein the predetermined pressure is a cracking pressure of the valve.

4. The oil squirter of claim 1, further comprising:
an outlet port defined by the valve body and in selective fluid communication with the inlet port; and
configured to output oil from the squirter.

5. The oil squirter of claim 1, wherein the delta pressure is created in opposition to an oscillatory movement of the piston.

6. The oil squirter of claim 1, wherein the damping vent stabilizes the axial movement of the piston to prevent cyclic contact of the piston and the valve seat during valve opening and closing.

7. The oil squirter of claim 1, wherein the damping vent is configured to stabilize movement of the piston to prevent piston noise during valve opening and closing.

8. The oil squirter of claim 1, wherein the piston guide is configured to axially align the piston with the valve seat to prevent at least one of binding of the piston, piston noise, and leakage due to axial misalignment of the piston and valve cylinder.

9. The oil squirter of claim 1, wherein the damping vent defines a predetermined cross-sectional area corresponding to a damping force generated by the delta pressure.

10. The oil squirter of claim 9, wherein the damping vent is configured as a cylindrical orifice defined by the piston guide.

11. A method of controlling oil distribution in an engine using an oil squirter in fluid communication with engine oil characterized by an engine oil pressure, the method comprising:
providing an oil squirter including a valve defining an oil flow path in fluid communication with the engine oil and an oil outlet, the valve characterized by a cracking pressure and including a valve body and a piston assembly, wherein:
the valve body includes an axial valve cylinder defining a valve seat and an inlet port in fluid communication with the oil outlet and the oil; and
the piston assembly includes:
a piston guide defining an axial piston cylinder;
a piston in slidable contact with the piston cylinder and defining a sealing face in fluid communication with the inlet port and the oil at the engine oil pressure;
a spring disposed in the piston cylinder in operative contact with the piston and configured to bias axial movement of the piston face toward the valve seat, wherein the piston face and valve seat are in sealing contact to close the valve when the engine oil pressure is less than the cracking pressure; and
a piston chamber defined by the piston cylinder and the piston and containing engine oil;
a damping orifice in fluid communication with an atmosphere of the engine and the piston chamber and configured to create delta pressure in the oil in the chamber in opposition to oscillatory movement of the piston;
opening the valve by increasing the engine oil pressure to at least the cracking pressure to axially displace the piston away from the valve seat; and
creating delta pressure in the oil in the chamber to unidirectionally displace the piston away from the valve seat while opening the valve.

12. The method of claim 11, further comprising:
closing the valve by decreasing the engine oil pressure below the cracking pressure to axially displace the piston toward the valve seat and seal the piston face to the valve seat; and
creating delta pressure in the oil in the piston chamber to unidirectionally displace the piston toward the valve seat while closing the valve.

13. The method of claim 12, wherein opening and closing the valve at a predetermined flow rate further includes creating delta pressure in the oil in the piston chamber to:
prevent cyclic contact between the piston face and the valve seat during valve opening and closing; and
unidirectionally displace the piston without axial oscillation of the piston.

14. The method of claim 12, wherein the delta pressure is defined by a cross-sectional area of the damping orifice.

15. The method of claim 12, wherein the damping orifice is defined by the piston guide and configured to prevent hydrolock of the piston and the piston guide.

16. An engine including a crankcase, an oil gallery containing oil at an engine oil pressure, and an oil squirter operatively attached to the crankcase and in fluid communication with the oil gallery and an atmosphere of the crankcase, the oil squirter including an outlet configured to distribute oil from the oil gallery within the crankcase, the oil squirter comprising:
a valve including a valve body and a piston assembly, wherein:
the valve body includes an axial valve cylinder defining a valve seat and an inlet port in fluid communication with the outlet and the oil gallery; and
the piston assembly includes:
a piston guide;
a piston in slidable contact with the piston guide and defining a sealing face in fluid communication with the inlet port, wherein engine oil pressure on the sealing face actuates the piston to axially move away from the valve seat;
a piston chamber defined by the piston and the piston guide and containing oil;

a spring disposed in the piston cylinder in operative contact with the piston and configured to bias axial movement of the piston face toward the valve seat; and a damping vent in fluid communication with the atmosphere and the piston chamber and configured to:

prevent hydrolock of the piston and the piston guide; and stabilize the axial movement of the piston by creating delta pressure in the oil in the piston chamber in opposition to oscillatory movement of the piston;

wherein:

a damping force provided by the delta pressure stabilizes axial movement of the piston to prevent axial oscillation of the piston during valve opening and closing;

when the engine oil pressure is below a valve cracking pressure, the piston face and the valve seat are in sealing contact to close the valve; and when the engine oil pressure is above the valve cracking pressure, the piston face is axially displaced from the valve seat to open the valve.

17. The engine of claim 16, wherein the damping force provided by the delta pressure prevents cyclic contact of the piston and valve seat during valve opening and closing.

18. The engine of claim 16, wherein fluctuations in engine oil pressure attributable to valve opening and closing are minimized.

19. The engine of claim 16, wherein the magnitude of the damping force is defined by the damping vent and a clearance between the piston and the piston guide.

20. The engine of claim 16, wherein the engine oil pressure during normal engine operation is less than the cracking pressure.

* * * * *